United States Patent
Suzuki et al.

(10) Patent No.: US 9,945,499 B2
(45) Date of Patent: Apr. 17, 2018

(54) METHOD AND APPARATUS FOR MANUFACTURING INTERLOCKING PIPE

(71) Applicant: SHOWA RASENKAN SEISAKUSHO CO., LTD., Tokyo (JP)

(72) Inventors: Norifusa Suzuki, Tokyo (JP); Ryouichi Fukabori, Saitama (JP)

(73) Assignee: SHOWA RASENKAN SEISAKUSHO CO., LTD., Tokyo (JP)

( * ) Notice: Subject to any disclaimer, the term of this patent is extended or adjusted under 35 U.S.C. 154(b) by 464 days.

(21) Appl. No.: 14/385,958

(22) PCT Filed: Feb. 28, 2013

(86) PCT No.: PCT/JP2013/056206
§ 371 (c)(1),
(2) Date: Sep. 17, 2014

(87) PCT Pub. No.: WO2014/132455
PCT Pub. Date: Sep. 4, 2014

(65) Prior Publication Data
US 2015/0040372 A1 Feb. 12, 2015

(30) Foreign Application Priority Data
Feb. 28, 2013 (JP) .................................. 2013-054071

(51) Int. Cl.
*B21C 37/12* (2006.01)
*F16L 9/22* (2006.01)
(Continued)

(52) U.S. Cl.
CPC .............. *F16L 9/22* (2013.01); *B21C 37/121* (2013.01); *B21C 37/127* (2013.01);
(Continued)

(58) Field of Classification Search
CPC .. F16L 9/22; F16L 9/02; B21C 37/128; B21C 37/121; B21C 37/127; B21C 37/157;
(Continued)

(56) References Cited

U.S. PATENT DOCUMENTS 3,526,395 A * 9/1970 Brown .................... B23K 7/002
266/49
3,845,645 A * 11/1974 Gebauer ................ B21C 37/128
219/62

(Continued)

FOREIGN PATENT DOCUMENTS

CN          1078180 A      11/1993
CN          202155390 U     3/2012
(Continued)

OTHER PUBLICATIONS

Written Opinion (WO) dated Jun. 11, 2013 for International Application No. PCT/JP2013/056206.
(Continued)

*Primary Examiner* — Ryan J Walters
*Assistant Examiner* — Lawrence Averick
(74) *Attorney, Agent, or Firm* — Ladas & Parry LLP

(57) ABSTRACT

The present invention provides a method and an apparatus for manufacturing an interlocking pipe obtained by easily and precisely shaping a pipe with a circular cross section or with the edges of the cross section nearly forming a circle in a non-loose manner, so as to provide excellent machining performance when the interlocking pipe is cut off and provide excellent operation efficiency for the apparatus itself. A metal band plate is helically wound onto a core member with a circular cross section or with the edges of the cross section nearly forming a circle. Clamping device is freely assembled at a front end of the code member in a detachable and switchable manner, and synchronously rotate (Continued)

in accordance with instructions from a main computing-controlling member, so as to prevent the metal band plate from being loosened, thereby to manufacture the interlocking pipe efficiently.

11 Claims, 8 Drawing Sheets

(51) Int. Cl.
    *F16L 9/02*           (2006.01)
    *B21C 37/15*         (2006.01)
    *B23K 10/00*        (2006.01)
    *F01N 13/18*         (2010.01)
    *B23K 101/06*       (2006.01)

(52) U.S. Cl.
    CPC .......... *B21C 37/128* (2013.01); *B21C 37/157* (2013.01); *B23K 10/00* (2013.01); *F16L 9/02* (2013.01); *B23K 2201/06* (2013.01); *F01N 13/1816* (2013.01); *Y10T 29/49927* (2015.01); *Y10T 29/5116* (2015.01)

(58) Field of Classification Search
    CPC .. B21C 619/02; B23K 10/00; B23K 2201/06; Y10T 29/49927; Y10T 29/5116; F01N 13/1816
    USPC ...... 72/50, 6.2, 28.2, 30.2, 66, 199, 371, 17, 72/11.6, 368, 12.7, 8.9, 12.8
    See application file for complete search history.

(56) References Cited

U.S. PATENT DOCUMENTS

| | | | | |
|---|---|---|---|---|
| 3,845,914 | A * | 11/1974 | Straujups | B65H 19/2253 242/527.5 |
| 3,940,962 | A * | 3/1976 | Davis | B21C 37/128 72/138 |
| 4,047,706 | A * | 9/1977 | Tronvold | B23K 7/002 209/665 |
| 4,061,264 | A * | 12/1977 | Bartels | B23K 9/0325 228/145 |
| 4,249,406 | A * | 2/1981 | Anderson | B21D 5/14 72/171 |
| 4,287,739 | A * | 9/1981 | Campbell | B21C 37/12 228/56.5 |
| 4,436,239 | A * | 3/1984 | Tsuyama | B23K 31/027 228/145 |
| 4,485,650 | A * | 12/1984 | Yamamoto | B21O 51/00 72/11.2 |
| 4,640,453 | A * | 2/1987 | Oe | B21C 37/123 228/145 |
| 4,706,481 | A * | 11/1987 | Castricum | B21C 37/127 72/132 |
| 5,079,938 | A * | 1/1992 | Schwarz | B21C 37/126 29/407.04 |
| 5,606,884 | A * | 3/1997 | Pettersson | B21C 37/126 72/41 |
| 5,617,645 | A * | 4/1997 | Wick | G01B 11/24 250/559.23 |
| 5,669,420 | A | 9/1997 | Herrero et al. | |
| 5,811,827 | A * | 9/1998 | Pryor | G01B 11/002 250/559.31 |
| 5,842,727 | A * | 12/1998 | Shade | F16L 25/0036 285/148.19 |
| 6,079,113 | A * | 6/2000 | Helmrichs | G01B 7/293 33/542 |
| 6,289,600 | B1 * | 9/2001 | Watts | G01B 11/08 33/542 |
| 6,501,042 | B2 * | 12/2002 | Alte | B21C 37/06 219/121.45 |
| 7,285,761 | B1 * | 10/2007 | Terziakin | B23K 13/01 219/149 |
| 7,476,034 | B2 * | 1/2009 | Shedlov | F16C 13/04 384/129 |
| 8,439,726 | B2 * | 5/2013 | Miller | B24C 1/045 451/102 |
| 8,941,023 | B2 * | 1/2015 | Holste | B21C 37/122 219/61 |
| 9,061,389 | B2 * | 6/2015 | Uchiuzo | B23B 31/20 |
| 9,086,242 | B2 * | 7/2015 | Newman, Jr. | F27D 25/001 |
| 2002/0084259 | A1 * | 7/2002 | Bertuzzi | B23K 10/00 219/121.39 |
| 2002/0100304 | A1 * | 8/2002 | Price | B21C 37/121 72/50 |
| 2005/0017091 | A1 * | 1/2005 | Olsen | B24C 1/045 239/400 |
| 2005/0049579 | A1 * | 3/2005 | Shedlov | F16C 13/04 606/1 |
| 2006/0163216 | A1 * | 7/2006 | Brandt | H05H 1/34 219/121.39 |
| 2006/0278291 | A1 | 12/2006 | Baumhoff et al. | |
| 2007/0204736 | A1 * | 9/2007 | Yu | H01R 43/16 83/613 |
| 2007/0215250 | A1 * | 9/2007 | Creel, Jr. | B23K 7/10 148/194 |
| 2007/0245789 | A1 * | 10/2007 | Zepp | B21C 37/121 72/49 |
| 2009/0320542 | A1 * | 12/2009 | Kephart | B21C 37/121 72/49 |
| 2011/0073209 | A1 | 3/2011 | Eguchi et al. | |
| 2011/0198320 | A1 | 8/2011 | Mather et al. | |
| 2015/0114192 | A1 * | 4/2015 | Peterson | G01N 1/08 83/23 |
| 2015/0273552 | A1 * | 10/2015 | Minch | B21C 37/127 72/50 |
| 2016/0175904 | A1 * | 6/2016 | Suzuki | B21C 37/12 72/43 |

FOREIGN PATENT DOCUMENTS

| | | |
|---|---|---|
| CN | 203103024 U | 7/2013 |
| EP | 2 556 912 A1 | 2/2013 |
| GB | 938049 | 9/1963 |
| JP | 56-126025 A | 10/1981 |
| JP | 60-187427 A | 9/1985 |
| JP | 57-175021 A | 10/1985 |
| JP | 60-221176 A | 11/1985 |
| JP | 1-254384 A | 10/1989 |
| JP | 6-344025 A | 12/1994 |
| JP | 7-16658 A | 1/1995 |
| JP | 7-185824 A | 7/1995 |
| JP | 8-218862 A | 8/1996 |
| JP | 9-155584 A | 6/1997 |
| JP | 10-166046 A | 6/1998 |
| JP | 11-344168 A | 12/1999 |
| JP | 2000-312973 A | 11/2000 |
| JP | 2004-52810 A | 2/2004 |
| JP | 2004-242408 A | 8/2004 |
| JP | 3686973 B2 | 6/2005 |
| JP | 2007-30025 A | 2/2007 |
| JP | 2001-58211 A | 3/2011 |
| JP | 2012-166260 A | 9/2012 |
| WO | 2007/035289 A2 | 3/2007 |
| WO | 2010/082058 A1 | 7/2010 |

OTHER PUBLICATIONS

Chinese Office Action dated Apr. 21, 2015 for Chinese Application No. 201380003755.0, with English translation.
Supplementary European Search Report dated Nov. 17, 2016 for Application No. EP 13 87 6247.
Espacenet English abstract of CN 203103024 U.
Espacenet English abstract of CN 202155390 U.
Espacenet English abstract of JP 3686973 B2.
Espacenet English abstract of JP 2012-166260 A.
Espacenet English abstract of JP 9-155584 A.

(56) References Cited

OTHER PUBLICATIONS

Espacenet English abstract of EP 2 556 912 A1.
Espacenet English abstract of CN 1078180 A.
Espacenet English abstract of JP 2001-58211 A.
Espacenet English abstract of JP 2004-242408 A.
Machine English Translation and English Abstract of JP 10-166046 A.
English Abstract of JP 56-126025 A.
Machine English Translation and English Abstract of JP 6-344025 A.
Machine English Translation and English Abstract of JP 7-16658 A.
Machine English Translation and English Abstract of JP 7-185824 A.
Machine English Translation and English Abstract of JP 2000-312973 A.
English Abstract of JP 1-254384 A.
Machine English Translation and English Abstract of JP 2007-30025 A.
English Abstract of JP 57-175021 A.
Espacenet English abstract of JP 11-344168 A.
Espacenet English abstract of JP 2004-52810 A.
Espacenet English abstract of JP 8-218862 A.

\* cited by examiner (a) initial position (b) contact (c) keeping a predetermined distance

METHOD AND APPARATUS FOR MANUFACTURING INTERLOCKING PIPE

RELATED APPLICATION INFORMATION

This application is a 371 of international Application PCT/JP2013/056206 filed on Feb. 28, 2013, which was published on 4 Sep. 2014 with International Publication Number WO 2014/132455 A1, which claims priority to Japanese Patent Application No. 2013-054071 filed on Feb. 28, 2013, the disclosures of which are incorporated in their entirety by reference herein.

TECHNICAL FIELD

The present invention relates to a method and an apparatus for manufacturing an interlocking pipe obtained by easily and precisely shaping a pipe with a circular cross section or with the edges of the cross section nearly forming a circle in a non-loose manner, so as to provide excellent machining performance when the interlocking pipe is cut off and provide excellent operation efficiency for the apparatus itself.

BACKGROUND

In the past, an exhaust pipe for a vehicle, such as a flexible pipe as shown in FIG. 8, is well known. That is, the flexible pipe 1 is a component capable of preventing the vibration from an engine side from being transferred to a downstream member. An interlocking-type flexible pipe 2 (hereinafter referred to as "interlocking pipe") for connecting an upstream member and the downstream member is arranged in the middle. Bellow 3 and an outer plate 4 are arranged outside the interlocking pipe. An end 3a of the bellow 3 and an end 4b of the outer plate 4 are provided with a protection element 5 bent in such a manner as to coincide with two ends of the interlocking pipe 2.

However, for the interlocking pipe 2 of the flexible pipe 1, as shown by the arrow in FIG. 8, a tabular metal band plate 2a is shaped into a curved metal band plate 2b (see FIG. 9) with an S-shaped cross section and wound helically so that bending portions at both sides thereof are engaged with each other. As a result, it is able to form the flexible interlocking pipe which can be stretched in both axial and radial directions.

Moreover, when shaping the interlocking pipe, the elongate tabular metal band plate 2a with a certain width is extracted from a decoiler 6 as shown in FIG. 9. The band plate 2a is coated with lubricating oil by an oil-applying device 7 while entering a multistage roll-forming device 8, and passes through a space between an upper roller 8a and a lower roller 8b, so as to form tabular metal band plate 2a into the curved metal band plate 2b with an S-shaped cross section (as shown by an extended line in FIG. 8). This curved metal band plate 2b is fed into a winding device 9 and helically wound in a way that the sides thereof are engaged with each other. Finally, it is cut into a predetermined length by a plasma cutting device (not shown).

In addition, the interlocking pipe 2 has a cross section with a circular shape or a polygonal shape. For example, Patent Literature 1 discloses that, for an interlocking pipe with a circular cross section, although with excellent impermeability, it is rotatable and thus easy to loosen, i.e., it has defects of being loosened and easy to be detached; while for an interlocking pipe with a polygonal cross section, although with poor impermeability, it is able to accurately set the rigidity of the interlocking pipe and the detachability of a guiding portion connected thereto due to the vibration. The polygonal end enables the hose to rotate without loosening while maintaining its predetermined shape and winding state (see paragraphs [0002]-[0005] of the Patent Literature).

That is, for the interlocking pipe with a polygonal cross section, although a core member with a polygonal cross section is used during winding, it can be hung over a polygonal end of the core member. Patent Literature 2 (see FIG. 2) and Patent Literature 4 (see FIG. 12) show such an interlocking pipe with a polygonal cross section.

On the other hand, for the interlocking pipe with a circular cross section, although a core member with a circular cross section is used during winding, it cannot be hung over due to its circular shape, and springback will occur during the winding, the pipe cannot be wound while maintaining its predetermined shape. In addition, rotation and loose may occur due to the springback of the thrust.

In order to overcome the above-mentioned drawbacks, Patent Literature 4 discloses in FIG. 1 that, after the interlocking pipe is wound into a diameter less than that of the final shape, a rewinding force, or a force in a direction opposite to a rotation direction, is applied to the interlocking pipe. The force in a direction opposite to the rotation direction may be applied by a roller or an elastic member.

PATENT LITERATURES

Patent Literature 1: Japanese laid-open 11-344168;
Patent Literature 2: Japanese laid-open 2004-52810;
Patent Literature 3: Japanese laid-open 2007-30025; and
Patent Literature 4: Japanese laid-open 08-218862.

SUMMARY

Problems to be Solved

The inventor considered the above background and studied to find an apparatus which can prevent springback when shaping an interlocking pipe with a circular cross section or with the edges of the cross section nearly forming a circle, which can easily and precisely shape the interlocking pipe in a non-loose manner without any rotation, and which can provide excellent operation efficiency.

In addition, there are other requirements for easily and efficiently shaping the interlocking pipe. For example, the additional oil-applying device is not required to be arranged at a preceding stage of multistage roll-forming device, instead an upper portion of the multistage roll-forming device has an oil-applying function integrally so as to apply the oil efficiently. It is also required to improve an oiling agent, e.g., lubricating oil mixed with water may be used, so as to improve the operation efficiency and reduce the cost. In addition, for interlocking pipe cutting device cooperating with the main body of the apparatus, it is required to form granular atomized slags during the cutting, and to remove these slags accumulated during the cutting efficiently.

An object of the present invention is to provide a method and an apparatus for manufacturing an interlocking pipe obtained by easily and precisely shaping a pipe with a circular cross section or with the edges of the cross section nearly forming a circle in a non-loose manner, so as to provide excellent machining performance when the interlocking pipe is cut of and provide excellent operation efficiency for the apparatus itself.

Method to Solve Problems

In order to achieve the above object, as a method for manufacturing an interlocking pipe, in a first solution, the interlocking pipe is shaped in accordance with instructions from a main computing-controlling member by bending an elongate metal band plate with a certain width into an S-shaped cross section and helically winding onto a winding core member in a way that adjacent end portions thereof are engaged with each other, wherein the interlocking pipe is of a shape with a circular cross section or with the edges of the cross section nearly forming a circle, and the method employs a clamping device, which is configured to synchronously rotate in such a manner that the metal band plate wound in accordance with the instructions from the main computing-controlling member cannot be loosened, and to freely clamp the metal band plate in a loose or tight manner. In a second solution, wherein the main computing-controlling member is configured to calculate in accordance with product diameter, pitch, product length and setting time of the wound metal band plate, and send instruction in accordance with a resultant value. In a third solution, wherein a pretreatment device cooperating with the main computing-controlling member is integrally provided with a multistage roll-forming device and an oil-applying device, the multistage roll-forming device is configured to shape the tabular metal band plate extracted from a decoiler into a metal band plate with curved side portions, and the oil-applying device is configured to apply oil from an upper portion of the multistage roll-forming device. In a fourth solution, wherein a coating agent of the oil-applying device is lubricating oil mixed with water. In a fifth solution, wherein a cutting device cooperating with the main computing-controlling member is arranged at a front end of the winding core member and configured to receive instruction for absorbing slags and scraping the accumulated slags. In a sixth solution, wherein the cutting device is configured to receive instruction of ejecting the air for cutting. In a seventh solution, wherein the cutting device is configured to receive instructions for starting the cutting as in contact with the wound metal band plate, separating therefrom immediately so as to maintain a predetermined distance from the metal band plate, and then stopping the cutting.

As an apparatus for manufacturing an interlocking pipe, in an eighth solution, the interlocking pipe is shaped in accordance with instructions from a controlling member by bending an elongate metal band plate with a certain width into an S-shaped cross section and helically winding onto a winding core member in a way that adjacent end portions thereof are engaged with each other, wherein the interlocking pipe is of a shape with a circular cross section or with the edges of the cross section nearly forming a circle, and the apparatus is provided with a clamping device, which is configured to synchronously rotate in such a manner that the metal band plate wound in accordance with the instructions from the controlling member cannot be loosened, and to freely clamp the metal band plate in a loose or tight manner. In a ninth solution, wherein the controlling member is configured to calculate in accordance with product diameter, pitch, product length and setting time of the wound metal band plate, and operate in accordance with a resultant value. In a tenth solution, wherein a pretreatment device cooperating with the controlling member is integrally provided with a multistage roll-forming device and an oil-applying device, the multistage roll-forming device is configured to shape the tabular metal band plate extracted from a decoiler into a metal band plate with curved side portions, and the oil-applying device is configured to apply oil from an upper portion of the multistage roll-forming device. In an eleventh solution, wherein a coating agent of the oil-applying device is lubricating oil mixed with water. In a twelfth solution, wherein a cutting device cooperating with the controlling member is arranged at a front end of the winding core member and configured to absorb slags and scrape the accumulated slags. In a thirteenth solution, wherein the cutting device is configured to eject the air for cutting. In a fourteenth solution, wherein the cutting device is configured to start the cutting as in contact with the wound metal band plate, to be separated therefrom immediately so as to maintain a predetermined distance from the metal band plate, and then to stop the cutting.

Technical Effects

According to the first and eighth solutions, when the interlocking pipe is shaped by bending the elongate metal band plate with a certain width into an S-shaped cross section and helically winding in a way that the adjacent end portions thereof are engaged with each other, due to the core member with a circular cross section or with the edges of the cross section nearly forming a circle as well as the clamping device synchronously rotating with the wound metal band plate, the interlocking pipe even if with a circular cross section can be obtained by easily and precisely shaping a pipe in a rotatable, non-loose, non-twisting and efficient manner.

According to the second and the ninth solutions, the operation and instruction are performed based on the value calculated in accordance with the product diameter, pitch, product length and setting time of the wound metal band plate, so it is able to further easily and precisely shaping in an efficient manner.

According to the third and tenth solutions, the additional oil-applying device is not arranged at a preceding stage of the multistage roll-forming device, instead the oil-applying function is enabled at an upper portion of the multistage roll-forming device, so it is able to apply the oil in a space-efficient manner.

According to the fourth and eleventh solutions, the lubricating oil mixed with water is used as the coating agent, so it is able to improve the operation efficiency and reduce the cost.

According to the fifth and twelfth solutions, the cutting device arranged at the front end of the winding core member is used to absorb the slags and scrape the accumulated slags, so it is able to remove the slags completely.

According to the sixth and thirteenth solutions, the air for cutting, rather than the expensive inert gases (e.g., Ar) or $CO_2$ used in the prior art, is supplied during the cutting, so it is able to reduce the cost.

According to the seventh and fourteenth solutions, the cutting device starts the cutting when it is in contact with the wound metal band plate and then is separated therefrom immediately so as to maintain a predetermined distance from the metal band plate. As a result, it is able to maintain the best cutting condition and prevent from cutting incompletely.

DETAILED DESCRIPTION

Figure 1:
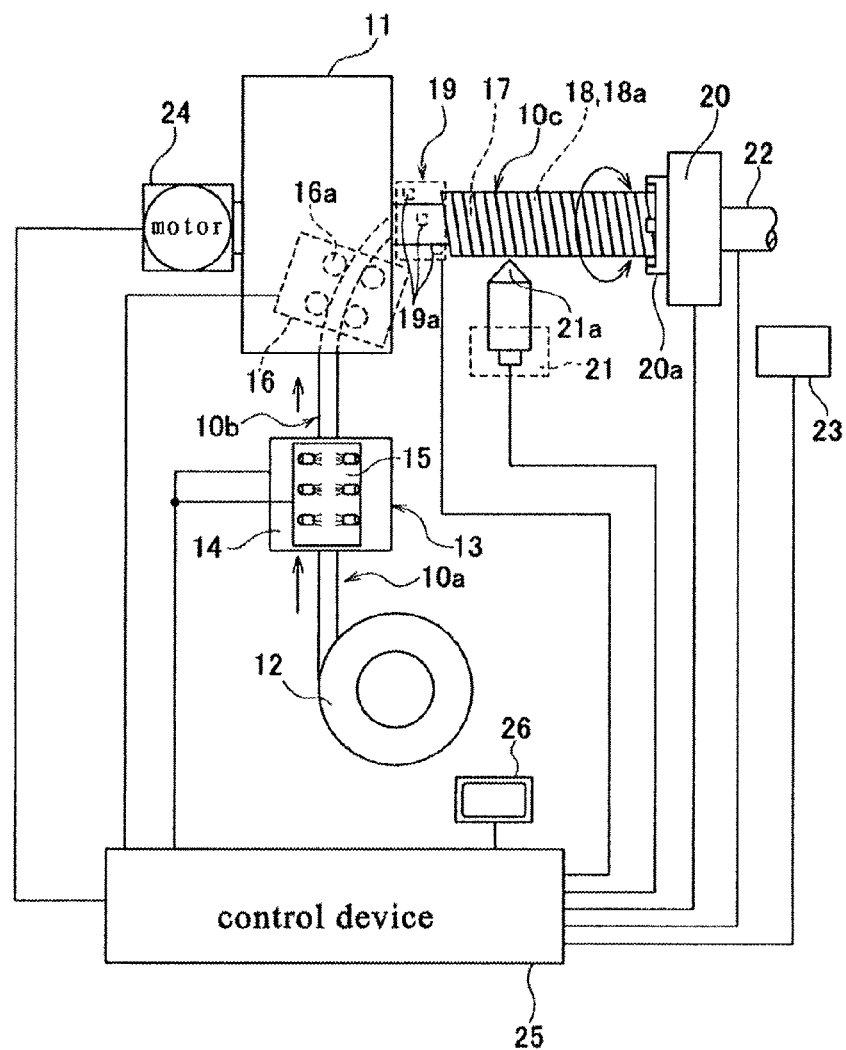
FIG. 1 is a top view showing a general construction of the present invention.

The embodiments of the present invention will be described hereinafter in conjunction with the drawings. FIG. 1 is a view showing a half-finished interlocking pipe 10 used as an exhaust pipe for a vehicle. An elongated, tabular metal band plate 10a with a certain width is bent into a curved metal band plate 10b and then shaped into a curved metal band plate 10c which is wound helically. Then, the metal band plate 10c is cut into a predetermined length so as to obtain the half-finished interlocking pipe 10. At the beginning, the tabular metal band plate 10a disposed at a decoiler 12 is extracted from the decoiler 12, and then fed into a pretreatment device 13 including a multistage roll-forming device 1d and an oil-applying device 15.

Figure 9:
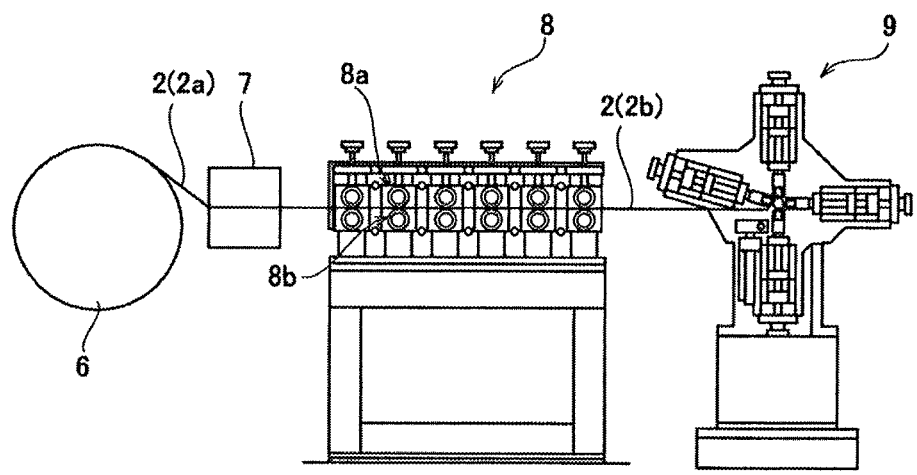
FIG. 9 is a schematic view showing the manufacturing of an existing interlocking pipe.

As shown in FIG. 9, the multistage roll-forming device 14 in the pretreatment device 13 is the well-known multistage roll-forming device substantially identical to the existing device. The tabular metal band plate 10a passes through the respective stage of the multistage roll-forming device to form the curved metal band plate 10b with an S-shaped cross section.

In addition, an upper portion of the multistage roll-forming device 14 in the pretreatment device 13 is integrally provided with the oil-applying device 15 for applying a coating agent, e.g., lubricating oil mixed with water, onto a back surface of the successively formed curved metal band plate 10b.

A main body 11 of the apparatus helically winds the curved metal band plate 10b extracted from the pretreatment device 3 onto a winding core member 17 (see right side in FIG. 9). That is, the feeding direction of the curved metal band plate 10b extracted from the pretreatment device 13 is changed by direction-variable guiding device 16 having variable guiding rollers 16a so as to helically wind the curved metal band plate 10b onto the winding core member 17.

In addition, a guiding device 19 is provided at the bottom of the winding core member 17.

Figure 2:
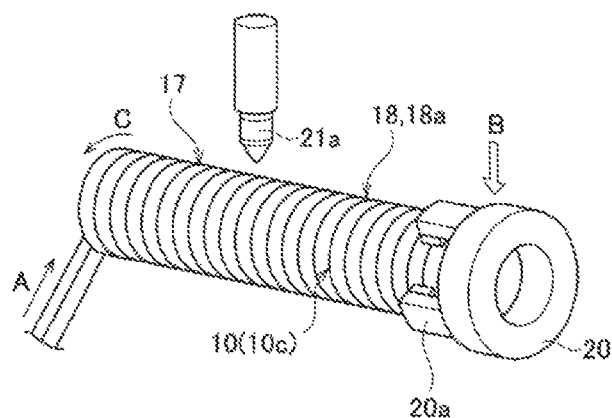
FIG. 2 is a perspective view showing the winding of the present invention.

The guiding device 19 has guiding rollers 19a provided on an axial line thereof, so that the curved metal band plate 10b in engagement with each other slides at a peripheral of the winding core member 17, so as to be wound helically. In FIG. 2, direction A is a winding-in direction.

Figure 5:
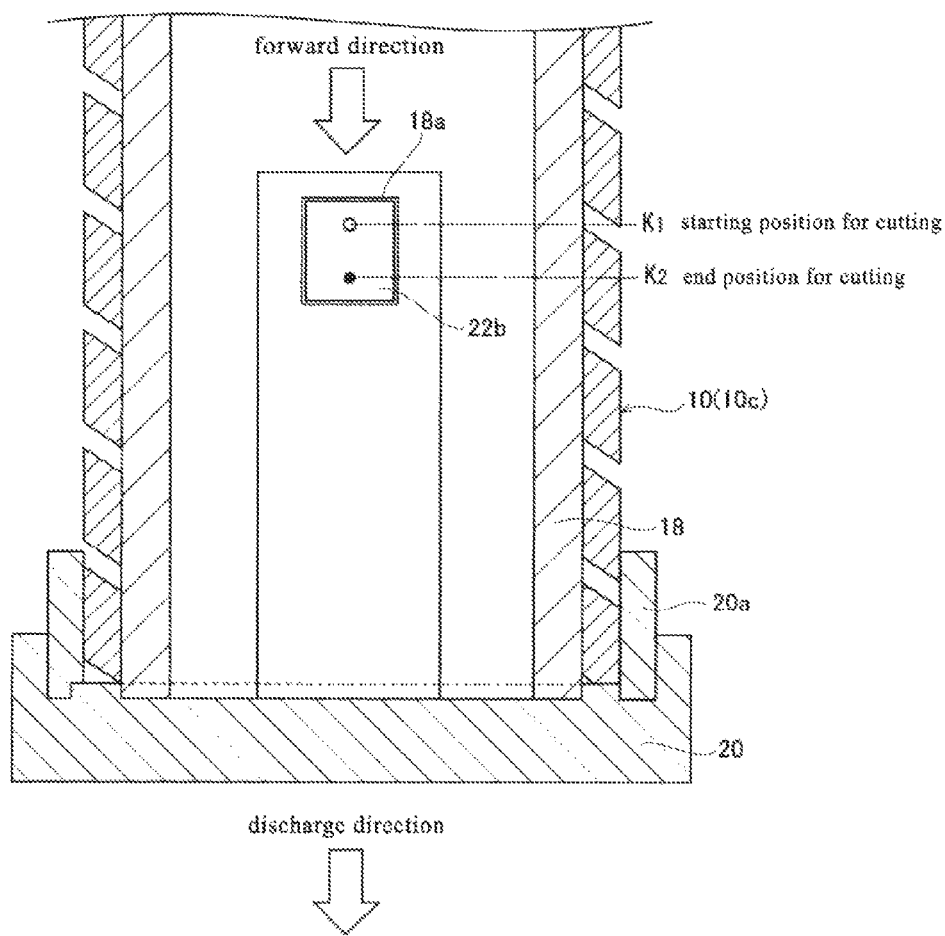
FIG. 5 is a top view showing the cutting portion in FIG. 4.
Figure 6:
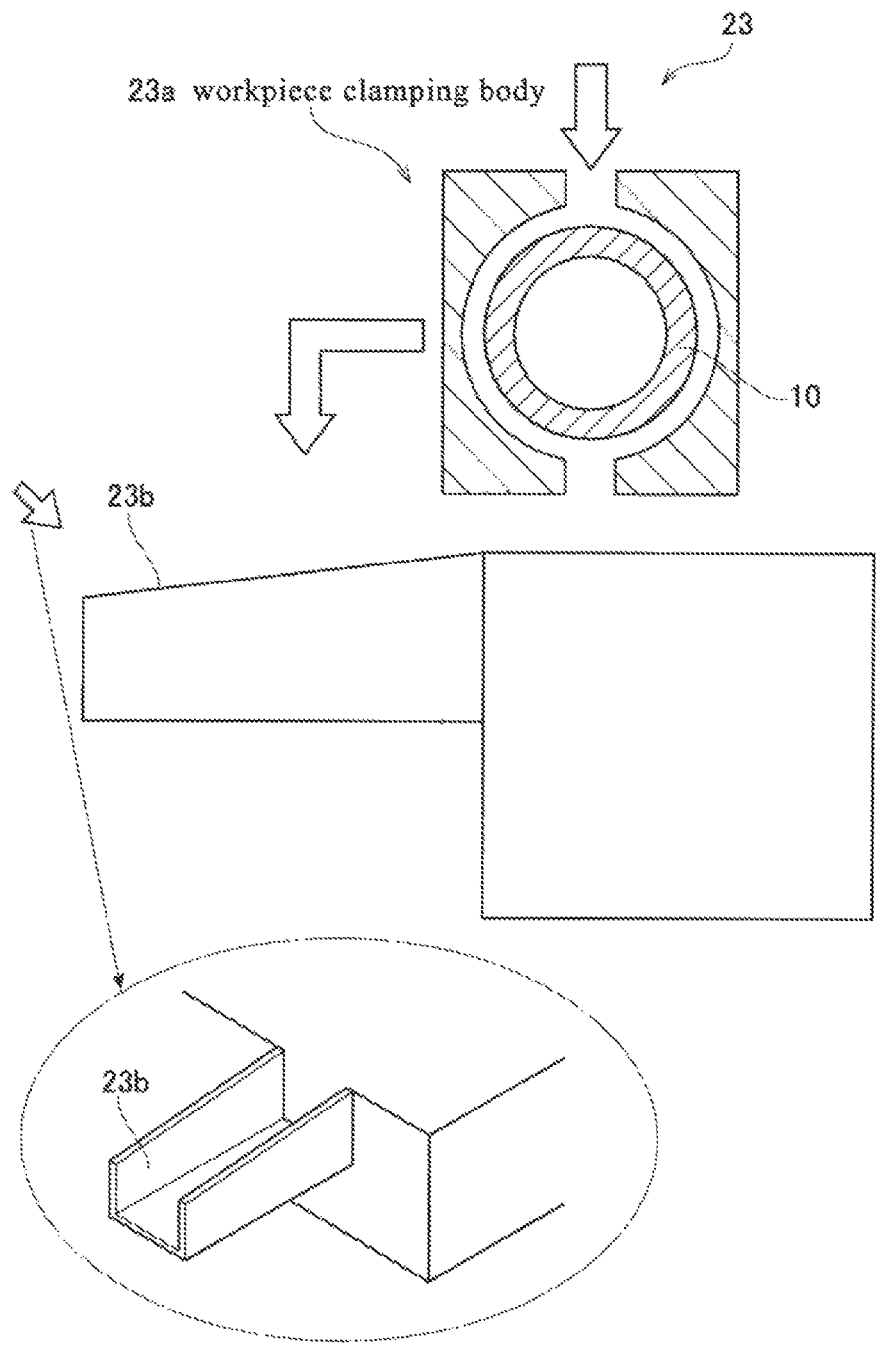
FIG. 6 is a view showing a workpiece conveyance device.

The winding core member 17 is driven to rotate by means of a motor 25 connected to the main body 11 of the apparatus, so as to wind the curved metal band plate 10b in a way that the end portions thereof are engaged with each other. In addition, a cutting core member 18 is provided in front of the winding core member 17, and an opening 18a (as shown in FIG. 5) for recovering slags is provided at a predetermined position of the cutting core member 18, i.e., a position opposite to a cutting member 21a at a front end of a plasma cutting device 21, which will be described hereinafter.

Moreover, clamping device 20 is provided in front of the winding core member 17 for clamping the helical, metal band plate 10b wounded on the winding core member 17 (along direction B in FIG. 2). As a result, it is able to prevent the springback or looseness due to the rotation of the helical, metal band plate 10b toward an opposite direction (direction C in FIG. 2) meanwhile the clamping device is freely assembled in a detachable and switchable manner. In addition, the structure of the clamping device 20 is not particularly defined herein, as long as it can function as mentioned above.

The movable plasma cutting device 21 is provided at an upper portion of the cutting core member 18. The plasma cutting device 21, although being movably arranged at the upper portion of the cutting core member 18 as mentioned above, is provided with a cutting member 21a at its front end for producing a plasma arc. The air for cutting is ejected from a cutting nozzle at a front opening of the cutting member 21a so as to heat and melt the helical, metal band plate 10b made of stainless steel, thereby to cut it of instantaneously.

Figure 3:
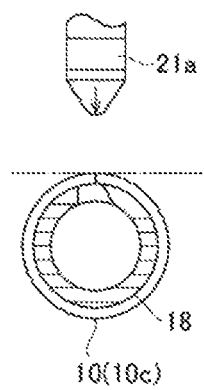
FIG. 3 is a view showing the actions during the cutting of the present invention.
Figure 3:
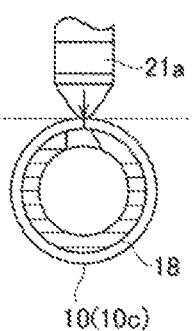
Figure 3:
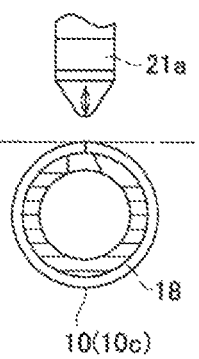

For the discharge action of the cutting member 21a, as shown in FIG. 3, when the cutting member 21a is in a standby state, it is located above the cutting core member 18 (see FIG. 3(a)). If the cutting member 21a is in action, it moves downward so that the cutting nozzle is in contact with the helical, metal band plate 10c instantaneously and discharges (see FIG. 3(b)). After that, the cutting member moves upward to a predetermined position, and cuts the metal band plate 10c as it discharges (see FIG. 3(c)). Finally, the discharge is stopped and the cutting member 21a returns to the initial position (see FIG. 3(a)).

After the cutting member 21a discharges while an electrode is in contact with the helical metal band plate (workpiece), the cutting is performed while maintaining an appropriate distance between the electrode and the helical metal band plate (workpiece), and then the current is switched off so as to stop the cutting. As a result, it is able to prevent from cutting incompletely, or to prevent an excessively-melted cut and the deformation as the discharge is not stopped after the cutting.

In addition, various heat sources may be applicable, and in this embodiment, it is appropriate to employ the cutting used air with a high-temperature plasma are to heat and melt and then cut off instantaneously. As a result, it is unnecessary to use the expensive inert gases e.g., Ar) or $CO_2$, as those used in the prior art, and the cost will be reduced.

Figure 4:
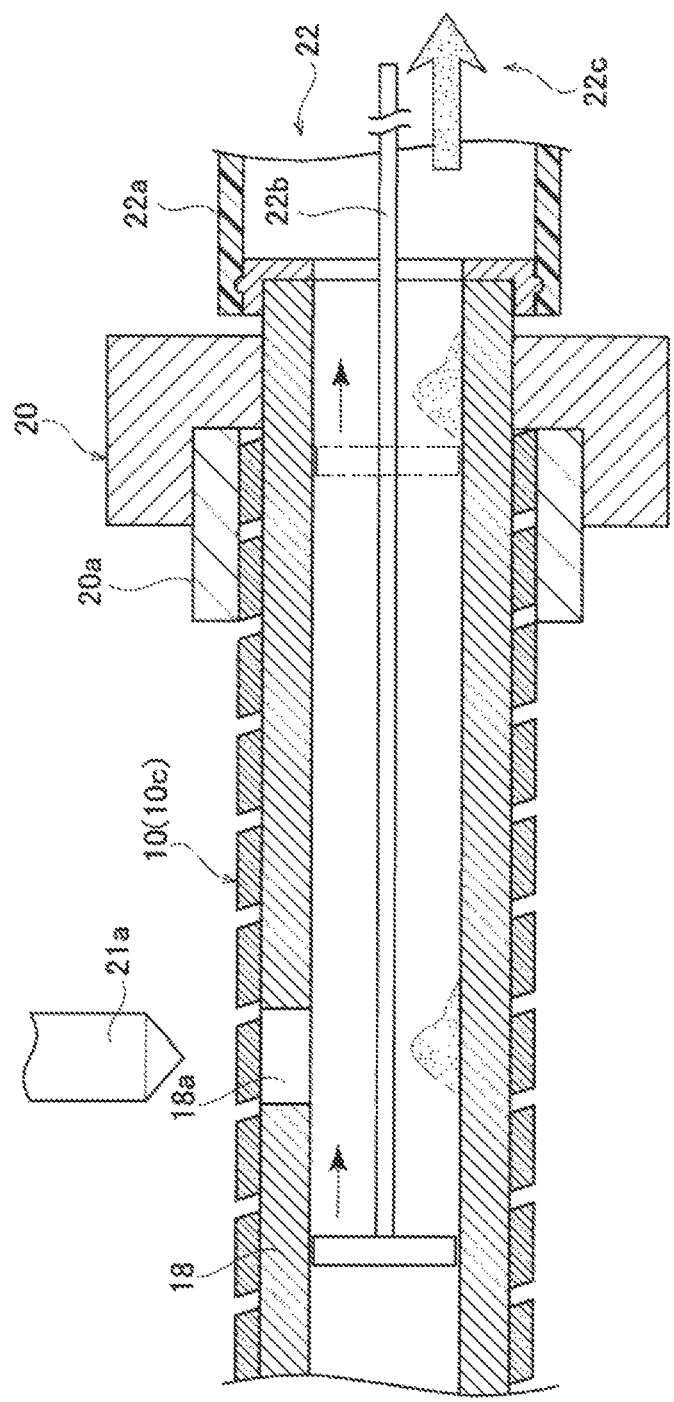
FIG. 4 is a sectional view showing the winding and cutting of the present invention.

FIGS. 4 and 5 show an enlarged portion of a cutting position. In FIG. 4, the cutting core member 18 and the clamping device 20 are provided at the cutting position in the forward direction of the helically wound curved metal band plate 10c. Meanwhile, slag recovering device 22 is provided inside the metal band plate 10c, the cutting core member 18 and the clamping device 20, and it is designed as a structure into which a pipe 22a and a scraping device 22b are inserted. In addition, the opening 18a of the cutting core member 18 is a slag receiving port, which is provided at a position opposite to the cutting member 21a of the plasma cutting device 21.

In FIG. 5, K1 represents an imaginary point of a starting position for the cutting, K2 represents an imaginary point of an end position for the cutting, and a distance therebetween represents a pitch for one revolution. However, when the metal band plate 10c moves for one pitch while rotating, the cutting member 21a will synchronously move with the metal band plate 10c for one pitch while rotating. In this way, it is cut along a line interlocking between the imaginary point K1 of the starting position for the cutting and the imaginary point K2 of the end position for the cutting.

As mentioned above, the slag recovering device 22 includes the pipe 22a, the scraping device 22b and a discharge path 22c. The opening 18a of the cutting core member 18 is provided at a position of the cutting core member 18 opposite to the cutting portion 21a to serve as the slag receiving port for receiving the slags produced during the cutting. The pipe 22a is used to remove the slags absorbed from the opening 18a to the outside, the scraping device 22b is used to scrape the slags, and the discharge path 22c is used to remove the scraped slags. In addition, a movement pitch for one rotation amount of the winding core member 17 and the cutting core member 18, e.g., a distance between the starting position a for cutting and the end position b for cutting or a cutting time, is calculated as product diameter×pitch×product length×setting time. The term "setting time" represents a production time (a setting tact) for each product. By setting and executing the setting tact, it is able to ensure the planned, stable production.

A workpiece conveyance device 23 is provided at a final stage of the main body 11 of the apparatus, and it can move toward a Y-axis (up and down) and an X-axis (right and left). A workpiece clamping body 23a is provided at a front end of the workpiece conveyance device 23, so as to clamp the half-finished interlocking pipe 10 which is cut into a predetermined size and convey it to a recovering case 23b at a conveyance region. In addition, the structure of the workpiece conveyance device 23 or the workpiece clamping body 23a is not particularly defined, as long as it can function as mentioned above.

Figure 7:
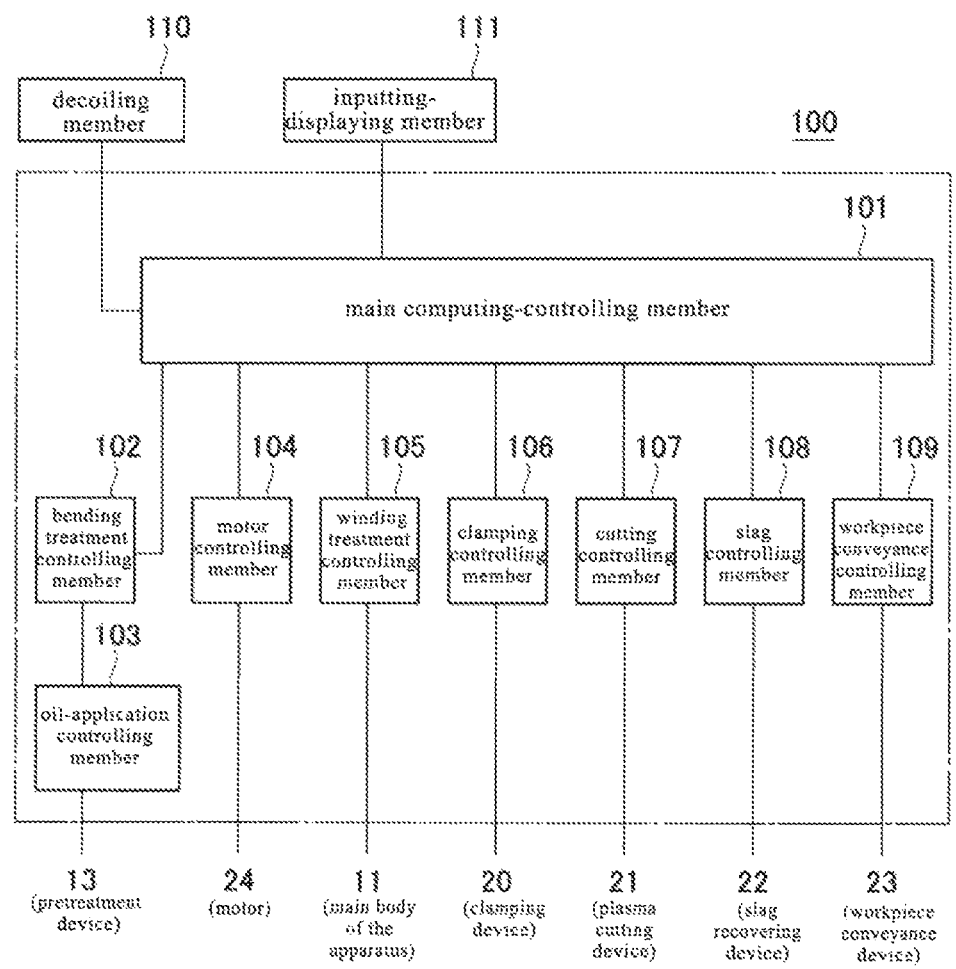
FIG. 7 is a view showing an electrical system of the present invention.
Figure 8:
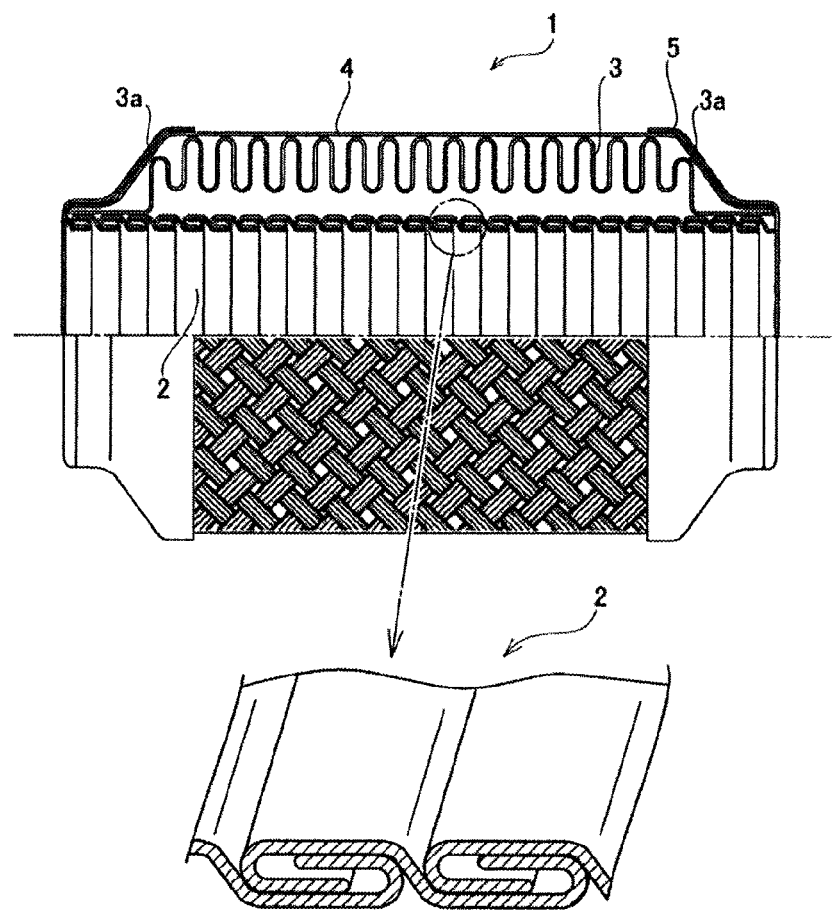
FIG. 8 are a half-sectional view and a partially enlarged sectional view showing an existing flexible pipe.

The structure of an electrical system according to the present invention will be described hereinafter in conjunction with FIG. 7. The electrical system 100 is a system of instructions from a main computing-controlling member 101 (25 in FIG. 1) that performs the calculation and control in accordance with the actions of the members, which includes: a bending treatment controlling member 102 (13 in FIG. 1) that outputs the instruction signal to bend the tabular metal band plate 10a into the curved metal band plate 10b; an oil-application controlling member 103 (14 in FIG. 1); a motor controlling member 104 (24 in FIG. 1); a winding treatment controlling member 105 (11 in FIG. 1) that controls the winding core member 17 to obtain the helically wound curved metal band plate 10c; a clamp controlling member 106 (20 in FIG. 1); a cutting controlling member 107 (21 in FIG. 1); a slag controlling member 108 (22 in FIG. 1); a workpiece conveyance controlling member 109 (23 in FIG. 1); a decoding member 110 (12 in FIG. 1), and an inputting-displaying member 111, etc.

As mentioned above, the main computing-controlling member 101 performs the calculation and control for the actions of the members connected to the apparatus. The action calculation is performed in accordance with the product diameter, pitch, product length, setting time (setting tact), and the position status of the action of the members.

Based on input information from the decoiling member 110 when the actions are performed or the actions performed by the members in the apparatus, the bending treatment controlling member 102 sends instruction in accordance with the instructions from the main computing-controlling member 101, so that the tabular metal band plate 10a extracted from the decoiler 12 is bent in the pretreatment device 13 into the curved metal band plate 10b.

The oil-application controlling member 103 receives the instruction when an action signal is input along with the operation of the bending treatment controlling member 102, so that the coating agent, e.g., the lubricating oil mixed with water, is applied onto a back surface of the curved metal band plate 10b of the multistage roll-forming device 14.

When the curved metal band plate 10b is extracted from the pretreatment device 13 and guided into the main body 11 of the apparatus, instructions are input from the main computing-controlling member 101 to the motor controlling member 104, so as to operate the winding core member 17.

By sending instruction signal to the motor controlling member 104, the winding core member 17 starts to rotate, thereby to form the helically wound curved metal band plate 10c. In case the curved metal band plate 10b fed by the multistage roll-forming device 14 is superposed on the curved metal band plate 10c that has been wound into a helical form, the guiding roller 19a will be damaged. In order to avoid this situation, a load on the guiding roller 19a will be measured, and when the measured value is greater than a predetermined value, the winding treatment controlling member 105 will send signal to the main computing-controlling member 101 to stop the apparatus.

When the winding core member 17 and the cutting core member 18 start to rotate, the clamping device 20 will act to rotate as well. Based on a value calculated in accordance with the product diameter, pitch, product length and setting time (setting tact), a filling instruction signal from the clamping member 20 will be output to the front portion of the curved metal band plate 10b through the instructions from the main computing-controlling member 101.

When the helically wound curved metal band plate 10c reaches a predetermined length, the main computing-controlling member 101 will send instruction signal to the cutting controlling member 107 in accordance with the signal from the plasma cutting device 21. At this time, the cutting member 21a of the plasma cutting device 21 moves along with the curved metal band plate 10c which is helically wound in accordance with the instruction from the main computing-controlling member 101 in parallel to the direction of winding one pitch for one revolution. By this action, the helically wound curved metal band plate 10c is cut in the direction perpendicular to axial direction instead of being cut in helical direction. In addition, the cutting member 211a receives instruction to perform the actions with respect to the helically wound curved metal band plate 10c to be kept at the initial position, to be contacted, to be kept at a predetermined distance, and to be kept at the initial position again. As a result, the cutting is maintained in a well state.

Then, the slag controlling member 108 operates in accordance with the instruction from the main computing-controlling member 101, and inputs instruction signal for absorbing and scraping the slags which have been cut in the slag recovering device 22.

Next, a signal is input into the workpiece conveyance member 109 by the instruction from the main computing-controlling member 101. The workpiece clamping body 23a starts to operate in accordance with the instruction, maintains the half-finished interlocking pipe 10 that has been cut, and releases the clamping member 20. The clamping member 20 and the winding core member 17 will move backward so as to be withdrawn from the interlocking pipe 10. Then, the workpiece clamping body 23a will operate to convey the interlocking pipe onto the workpiece receiving member 23b.

In addition, reference sign 111 represents an inputting-displaying member which may include, as expected, an appropriate unit such as an inputting unit or an image displaying unit.

In this embodiment, when shaping the tube with circular cross section in a non-loose, precise and easy way, because the core member has a circular cross section or the edges of the cross section nearly forms a circle and the clamping device synchronously rotates with the wound metal band plate, it is able to provide an automatically-shaping apparatus so as to obtain an interlocking pipe even it is circular shaped by easily and precisely shaping a pipe in a rotatable, non-loose, non-twisting and efficient manner.

In addition, due to the other requirements to easily and efficiently shape the interlocking pipe, the additional oil-applying device is not required to be arranged at a preceding stage of the multistage roll-forming device, instead an upper portion of the multistage roll-forming device has an oil-applying function integrally so as to work efficiently. Meanwhile, the coating agent is also improved, e.g., the lubricating oil mixed with water may be used in order to improve the operation efficiency and reduce the cost.

In addition, when the interlocking pipe cooperating with the main body of the apparatus is cut off the slags produced belong to granular atomized slags; besides, the slags accumulated during the cutting will be removed efficiently.

Hence, according to the present invention, it is able to obtain the interlocking pipe by easily and precisely shaping a pipe with a circular cross section or with the edges of the cross section nearly forming a circle in a non-loose manner, so as to provide excellent machining performance when the interlocking pipe is cut off and provide excellent operation efficiency for the apparatus itself.

REFERENCE SIGN LIST 10 metal band plate for interlocking pipe
10a tabular metal band plate
10b curved metal band plate
10c helically wound curved metal band plate
11 main body of the apparatus
12 decoiler
13 pretreatment device
14 multistage roll-forming device
15 oil-applying device
16 direction-variable guiding device
16a, variable guiding roller
17 winding core member
18 cutting core member
18a opening of core member
19 winding guiding device
19a winding guiding roller
20 clamping device
20a clamping body
21 plasma cutting device
21a cutting member
22 slag recovering device
22a pipe
22b scraping device
22c discharge path
23 workpiece conveyance device
23a workpiece clamping body
23b workpiece receiving member
24 motor
25 control device
26 display device
100 electrical system
101 main computing-controlling member
102 bending treatment controlling member
103 oil-application controlling member
104 motor controlling member
105 winding treatment controlling member
106 clamping controlling member
107 cutting controlling member
108 slag controlling member
109 workpiece conveyance controlling member
110 decoiling member
111 inputting-displaying member

What is claimed is:

1. A method for manufacturing an interlocking pipe, the interlocking pipe being shaped in accordance with instructions from a main computing-controlling member by bending an elongate metal band plate with a certain width into an S-shaped cross section and helically winding onto a winding core member in a way that adjacent end portions thereof are engaged with each other, wherein the interlocking pipe is of a shape with a circular cross section or with edges of the cross section nearly forming a circle, and the method comprises the following steps:

calculating, by the main computing-controlling member in accordance with product diameter, pitch, product length, and setting time of the wound metal band plate, and sending an instruction in accordance with a resultant value;

synchronously rotating, by a clamping device together with the interlocking pipe and around a same axis, in such a manner that the metal band plate wound in accordance with the instructions from the main computing-controlling member cannot be loosened, wherein the clamping device freely clamps the metal band plate helically wound onto the winding core member in a loose or tight manner; and cooperating, by a cutting device, with the main computing-controlling member, wherein the cutting device is arranged at a front end of the winding core member, wherein, during manufacturing of the interlocking pipe, a winding treatment controlling member sends a signal to the main computing-controlling member to stop an apparatus for manufacturing the interlocking pipe when a load on a guiding roller is greater than a predetermined value, and a guiding device is provided at the front end of the winding core member, the guiding device having guiding rollers provided on an axial line thereof.

2. The method according to claim 1, further comprising using a multistage roll-forming device to shape the tabular metal band plate extracted from a decoiler into a metal band plate with curved side portions, using an oil-applying device to apply oil from an upper portion of the multistage roll-forming device, wherein the multistage roll-forming device and the oil-applying device constitute a pretreatment device cooperating with the main computing-controlling member.

3. The method according to claim 1, further comprising using lubricating oil mixed with water as a coating agent of the oil-applying device.

4. The method according to claim 1, wherein the cutting device receives an instruction to eject a cutting used air with a high-temperature plasma arc to heat and melt and then cut off instantaneously.

5. The method according to claim 1, wherein the cutting device receives instructions to start cutting as the cutting device is in contact with the wound metal band plate, separate from the wound metal band plate immediately so as to maintain a predetermined distance from the metal band plate, and then stop the cutting.

6. An apparatus for manufacturing an interlocking pipe, the interlocking pipe being shaped in accordance with instructions from a controlling member by bending an elongate metal band plate with a certain width into an S-shaped cross section and helically winding onto a winding core member in a way that adjacent end portions thereof are engaged with each other, wherein the interlocking pipe is of a shape with a circular cross section or with the edges of the cross section nearly forming a circle, and the apparatus is provided with the following devices:

the main computing-controlling member, which is configured to calculate in accordance with product diameter, pitch, product length, and setting time of the wound metal band plate, and send an instruction in accordance with a resultant value;

a clamping device, which is configured to synchronously rotate, together with the interlocking pipe and around a same axis in such a manner that the metal band plate wound in accordance with the instructions from the controlling member cannot be loosened, and to freely clamp the metal band plate helically wound onto the winding core member in a loose or tight manner; and a cutting device, which cooperates with the main computing-controlling member and is arranged at a front end of the winding core member, wherein a guiding device is provided at the front end of the winding core member, the guiding device having guiding rollers provided on an axial line thereof, and during manufacturing of the interlocking pipe, a winding treatment controlling member sends a signal to the main computing-controlling member to stop the apparatus when a load on the guiding roller is greater than a predetermined value.

7. The apparatus according to claim 6, wherein a pretreatment device cooperating with the controlling member is integrally provided with a multistage roll-forming device and an oil-applying device, the multistage roll-forming device being configured to shape the tabular metal band plate extracted from a decoiler into a metal band plate with curved side portions, and the oil-applying device being configured to apply oil from an upper portion of the multistage roll-forming device.

8. The apparatus according to claim 6, wherein a coating agent of the oil-applying device is lubricating oil mixed with water.

9. The apparatus according to claim 6, wherein the cutting device is configured to eject a cutting used air with a high-temperature plasma arc to heat and melt and then cut off instantaneously.

10. The apparatus according to claim 6, wherein the cutting device is configured to start the cutting as in contact with the wound metal band plate, to be separated therefrom immediately so as to maintain a predetermined distance from the metal band plate, and then to stop the cutting.

11. A method for manufacturing an interlocking pipe, the interlocking pipe being shaped in accordance with instructions from a main computing-controlling member by bending an elongate metal band plate with a certain width into an S-shaped cross section and helically winding onto a winding core member in a way that adjacent end portions thereof are engaged with each other, wherein the interlocking pipe is of a shape with a circular cross section or with edges of the cross section nearly forming a circle, and the method comprises the following steps:

calculating, by the main computing-controlling member, in accordance with product diameter, pitch, product length, and setting time of the wound metal band plate, and sending an instruction in accordance with a resultant value;

synchronously rotating, by a clamping device together with the interlocking pipe and around a same axis, in such a manner that the metal band plate wound in accordance with the instructions from the main computing-controlling member cannot be loosened, wherein the clamping device freely clamps the metal band plate helically wound onto the winding core member in a loose or tight manner, and cooperating, by a cutting device, with the main computing-controlling member, wherein the cutting device is arranged at a front end of the winding core member, wherein the cutting device receives instructions to start cutting as the cutting device is in contact with the wound metal band plate, separate from the wound metal band plate immediately so as to maintain a predetermined distance from the metal band plate, and then stop the cutting.

* * * * *